US011868063B2

(12) United States Patent
Kato

(10) Patent No.: US 11,868,063 B2
(45) Date of Patent: Jan. 9, 2024

(54) DEVELOPING DEVICE WITH VALVE FOR DISCHARGE PATH AND IMAGING SYSTEM WITH DEVELOPING DEVICE

(71) Applicant: HEWLETT-PACKARD DEVELOPMENT COMPANY, L.P., Spring, TX (US)

(72) Inventor: Yuya Kato, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/925,702

(22) PCT Filed: Feb. 1, 2021

(86) PCT No.: PCT/US2021/016023
§ 371 (c)(1),
(2) Date: Nov. 16, 2022

(87) PCT Pub. No.: WO2021/236180
PCT Pub. Date: Nov. 25, 2021

(65) Prior Publication Data

US 2023/0205111 A1 Jun. 29, 2023

(30) Foreign Application Priority Data

May 18, 2020 (JP) ................................ 2020-086726

(51) Int. Cl.
*G03G 15/08* (2006.01)

(52) U.S. Cl.
CPC ..... *G03G 15/0877* (2013.01); *G03G 15/0893* (2013.01)

(58) Field of Classification Search
CPC ........... G03G 15/0877; G03G 15/0889; G03G 15/0891; G03G 15/0893; G03G 21/206; G03G 2221/1645
See application file for complete search history.

(56) References Cited

U.S. PATENT DOCUMENTS

| | | | |
|---|---|---|---|
| 7,881,644 | B2 | 2/2011 | Okamoto et al. |
| 8,260,175 | B2 | 9/2012 | Ichikawa et al. |
| 9,323,180 | B2 | 4/2016 | Kashimoto et al. |

(Continued)

FOREIGN PATENT DOCUMENTS

| | | | |
|---|---|---|---|
| JP | 2009-210684 | A | 9/2009 |
| JP | 2019-082642 | A | 5/2019 |

(Continued)

*Primary Examiner* — Hoang X Ngo
(74) *Attorney, Agent, or Firm* — Foley & Lardner LLP

(57) ABSTRACT

A developing device includes a developer carrier to carry a developer, a conveyance path to circulate the developer and supply the developer to the developer carrier, a discharge path extending from the conveyance path and including a discharge port to discharge a portion of the developer, as excess developer, and a valve body provided between the conveyance path and the discharge port. The valve body includes an inlet side oriented toward the conveyance path and an outlet side disposed opposite the inlet side to allow a passage of the excess developer from the conveyance path through the valve body toward the discharge port, when a pressure applied to the inlet side is greater than a pressure threshold value.

15 Claims, 14 Drawing Sheets

(56) References Cited

U.S. PATENT DOCUMENTS

| | | | | |
|---|---|---|---|---|
| 2015/0132027 | A1 | 5/2015 | Kashimoto et al. | |
| 2016/0041504 | A1 | 2/2016 | Ueda et al. | |
| 2016/0209777 | A1 | 7/2016 | Mugita et al. | |
| 2016/0306291 | A1* | 10/2016 | Kuroda | G03G 21/12 |
| 2018/0081299 | A1* | 3/2018 | Okuno | G03G 15/0877 |
| 2019/0302691 | A1* | 10/2019 | Kawahito | G03G 15/0875 |

FOREIGN PATENT DOCUMENTS

| | | | |
|---|---|---|---|
| RU | 2653184 | C1 | 5/2018 |
| WO | 2019/088469 | A1 | 5/2019 |

* cited by examiner

DEVELOPING DEVICE WITH VALVE FOR DISCHARGE PATH AND IMAGING SYSTEM WITH DEVELOPING DEVICE

CROSS REFERENCE TO RELATED APPLICATIONS

This application is a U.S. National Stage Application which claims the benefit under 35 U.S.C. § 371 of International Patent Application No. PCT/US2021/016023 filed on Feb. 1, 2021, which claims priority benefit from Japanese Patent Application No. 2020-086726 filed on May 18, 2020, the contents of each of which are incorporated herein by reference.

BACKGROUND

An imaging system includes a conveying device which conveys a print medium, a photosensitive body on which an electrostatic latent image is to be formed, a developing device which develops the electrostatic latent image, a transfer device which transfers a toner image to the print medium, a fixing device which fixes the toner image to the print medium, and a discharge device which discharges the print medium.

DETAILED DESCRIPTION

Hereinafter, an example imaging system will be described with reference to the drawings. This imaging system includes a valve body that prevents an excessive discharge of a developer in a developing device. The imaging system may be an imaging apparatus such as a printer or a device for an imaging apparatus, such as a developing device or the like. In the following description, with reference to the drawings, the same reference numbers are assigned to the same components or to similar components having the same function, and overlapping description is omitted.

Figure 1:
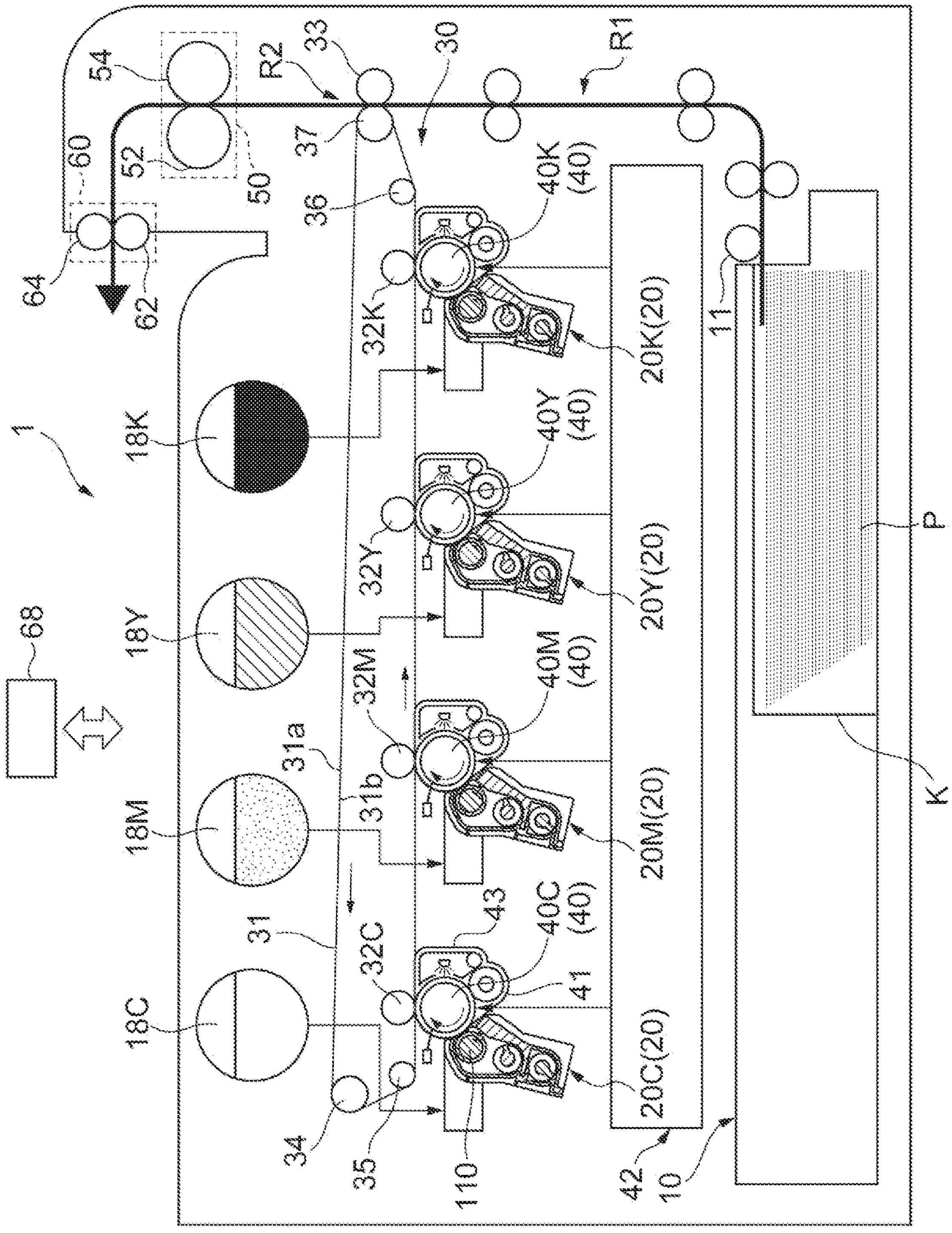
FIG. 1 is a schematic diagram of an example imaging system.

With reference to FIG. 1, an example imaging apparatus 1 forms a color image by using cyan, magenta, yellow, and black toners. The imaging apparatus 1 includes a conveying device 10 which conveys a sheet P corresponding to a print medium, a plurality of toner tanks 18C, 18M, 18Y, and 18K that store the cyan, magenta, yellow, and black toners, a plurality of developing devices 20C, 20M, 20Y, and 20K (hereinafter referred to also as a "developing device 20" when describing any one of the developing devices 20C, 20M, 20Y, and 20K) which develop electrostatic latent images, a transfer device 30 which secondarily transfers a composite toner image to the sheet P, a plurality of photosensitive bodies 40C, 40M, 40Y, and 40K (hereinafter also referred to as a "photosensitive body 40" when describing any one of the photosensitive bodies 40C, 40M, 40Y, and 40K) which form the electrostatic latent images, a fixing device 50 which fixes the composite toner image to the sheet P, and a discharge device 60 which discharges the sheet P.

The conveying device 10 conveys the sheet P corresponding to a print medium on which an image is to be formed, along a conveyance route R1. The sheets P are accommodated so as to be stacked in a cassette K and are picked up and conveyed by a feeding roller 11. The conveying device 10 allows the sheet P to reach a transfer region R2 through the conveyance route R1 at a timing in which the composite toner image to be transferred to the sheet P reaches the transfer region R2.

The four developing devices 20C, 20M, 20Y, and 20K are provided for the four colors of cyan, magenta, yellow, and black, respectively. As will be described later, each developing device 20 includes a developer carrier 110 which carries a toner to an adjacent photosensitive body 40. In the developing device 20, a two-component developer containing a toner and a carrier is used as the developer. That is, in the developing device 20, amounts of the toner and the carrier are set to a targeted mixing ratio and are further mixed and stirred so that the toner is dispersed in the developer. Accordingly, the developer is adjusted to have an optimal or targeted charge amount. This developer is carried by the developer carrier 110. When the developer is conveyed to a developing region facing the photosensitive body 40 with the rotation of the developer carrier 110, the toner contained in the developer carried by the developer carrier 110 moves by electrostatically force, to the electrostatic latent image formed on a peripheral surface of the photosensitive body 40 so that the electrostatic latent image is developed thereby forming a single-color toner image.

The photosensitive bodies 40C, 40M, 40Y, and 40K are also referred to as electrostatic latent image carriers, photosensitive drums, or the like. The four photosensitive bodies 40C, 40M, 40Y, and 40K are provided for the four colors of cyan, magenta, yellow, and black, respectively, and are positioned along the movement direction of the transfer belt 31. The developing device 20, a charging device 41, and a cleaning device 43 are provided around each photosensitive body 40. Additionally, an exposure unit 42 is provided adjacent the four photosensitive bodies 40C, 40M, 40Y, and 40K.

The charging device 41 is in contact with the photosensitive body 40 so as to charge the surface of the photosensitive body 40 to a predetermined potential. The exposure unit 42 exposes the surface of the photosensitive body 40 that has been charged by the charging device 41, in response to an image to be formed on the sheet P. Accordingly, a potential of a portion exposed by the exposure unit 42 in the surface of the photosensitive body 40 changes so that the electrostatic latent image is formed. The developing devices 20C, 20M, 20Y, and 20K develop the electrostatic latent images formed on the respective photosensitive bodies 40C, 40M, 40Y, and 40K, by using the toners supplied from the toner tanks 18C, 18M, 18Y, and 18K that are positioned to face the respective developing devices 20C, 20M, 20Y, and 20K, so that respective single-color toner images are generated on the photosensitive bodies 40C, 40M, 40Y, and 40K. The cleaning device 43 collects the toner remaining on each photosensitive body 40 after the single-color toner image formed on the photosensitive body 40 is primarily transferred to the transfer belt 31.

The transfer device 30 conveys a composite toner image resulting from single-color toner images, to the transfer region R2 where the composite toner image is to be secondarily transferred to the sheet P. The transfer device 30 includes a transfer belt 31 to which the single-color toner images are primarily transferred from the photosensitive bodies 40C, 40M, 40Y, and 40K, a tension roller 34 which tensions the transfer belt 31, idler rollers 35 and 36, a drive roller 37 which drives the transfer belt 31, primary transfer rollers 32C, 32M, 32Y, and 32K which are positioned adjacent the photosensitive bodies 40C, 40M, 40Y, and 40K, respectively, and a secondary transfer roller 33 which is positioned adjacent the drive roller 37. The transfer belt 31 extends between the primary transfer rollers 32C, 32M, 32Y, and 32K, and the photosensitive bodies 40C, 40M, 40Y, and 40K, so that the single-color toner images are primarily transferred from the four photosensitive bodies 40C, 40M, 40Y, and 40K and sequentially layered on the transfer belt 31, so as to form the composite toner image. The transfer belt 31 additionally extends along the second transfer region R2 between secondary transfer roller 33 and the adjacent the drive roller 37 to secondarily transfer the composite toner to the sheet P.

The fixing device 50 conveys the sheet P to pass through a fixing nip region for heating and pressing the sheet so that the composite toner image secondarily transferred from the transfer belt 31 to the sheet P is attached and fixed to the sheet P. The fixing device 50 includes a heating roller 52 which heats the sheet P and a pressing roller 54 which is rotationally driven while pressing against the heating roller 52. The heating roller 52 and the pressing roller 54 are formed in a cylindrical shape and the heating roller 52 has a heat source such as a halogen lamp therein. The fixing nip region corresponding to a contact region is provided between the heating roller 52 and the pressing roller 54 of the fixing device 50. The composite toner image is melted and fixed to the sheet P when the sheet P is conveyed through the fixing nip region, to form a fixed toner image on the sheet P.

The discharge device 60 includes discharge rollers 62 and 64 for discharging the sheet P with the fixed toner image toward the outside of the imaging apparatus 1.

The imaging apparatus 1 further includes a controller 68 to control the operation of the imaging apparatus 1. The controller 68 may include a computer that includes a processor, a storage device, a user interface device which may include an input device and a display device, and the like. A control program for controlling various processes to be executed by the imaging apparatus 1 using the processor is stored, in the form of data and/or instructions, in the storage device of the controller 68.

Figure 2:
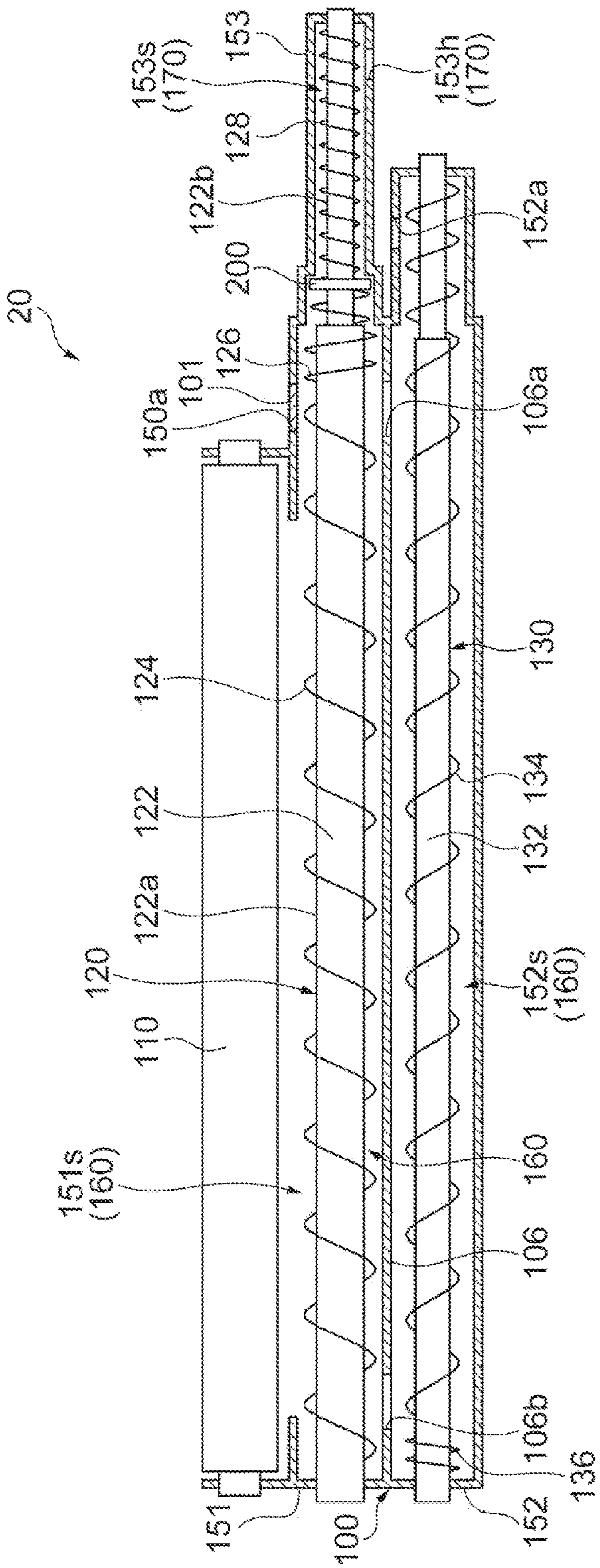
FIG. 2 is a cross-sectional view of an example developing device.

With reference to FIG. 2, an example developing device 20 will be described. As described above, the developing device 20 uses a two-component developer including a toner and a carrier as a developer. A trickle developing system is adopted for the developing device 20. The developing device 20 discharges an old developer from the discharge port and replenishes a new developer into the casing in order to extend the life of the developer.

As illustrated in FIG. 2, the example developing device 20 includes a casing 100, the developer carrier 110, a first conveying member 120, and a second conveying member 130.

The casing 100 includes a first casing portion 151, a second casing portion 152, and a third casing portion 153. The first casing portion 151 defines a first space 151*s*. The second casing portion 152 defines a second space 152*s* which is continuous with the first space 151*s*. The second casing portion 152 is provided with a developer replenishing port 152*a*. A replenishment developer is supplied to the second space 152*s* through the developer replenishing port 152*a*.

A partition plate 106 that partitions the first space 151*s* and the second space 152*s* is provided between the first casing portion 151 and the second casing portion 152. The partition plate 106 is provided with an opening 106*a* and an opening 106*b*. That is, the first space 151*s* and the second space 152*s* communicate with each other through the opening 106*a* and the opening 106*b*. As will be described later, the first space 151*s* and the second space 152*s* form a conveyance path 160 that circulates the developer to be supplied to the developer carrier 110.

The third casing portion 153 defines a third space 153*s*. The third casing portion 153 is connected to the first casing portion 151 so that the third space 153*s* communicates with the first space 151*s*. The third casing portion 153 is provided with a discharge port 153*h* for discharging a deteriorated developer. As will be described later, the third space 153*s* and the discharge port 153*h* form a discharge path 170 for discharging a portion of the developer, as excess developer for example.

The developer carrier 110 is provided inside the first space 151*s*. The developer carrier 110 is, for example, a developing roller that supplies a toner to the electrostatic latent image formed on the peripheral surface of the adjacent photosensitive body 40 (cf. FIG. 1). The developer carrier 110 is supported by the first casing portion 151 so as to be rotatable by the operation of a drive motor. When the developer carrier 110 rotates, air is taken into the first space 151*s* so that the internal pressure of the casing 100 increases. In order to release the internal pressure of the casing 100, the first casing portion 151 may be provided with a pressure release hole 150*a*. In order to prevent the leakage of the developer, the pressure release hole 150*a* may be covered with a filter 101.

The first conveying member 120 is provided inside the first space 151*s* and the third space 153*s*. The first conveying member 120 is supported by the first casing portion 151 and the third casing portion 153 so as to be rotatable by the operation of a drive motor. The first conveying member 120 includes a shaft portion 122 that extends over the first space 151*s* and the third space 153*s*.

The shaft portion 122 of the first conveying member 120 includes a first portion 122*a* which is disposed in the first space 151*s* and a second portion 122*b* which is disposed in the third space 153*s*. The first portion 122*a* of the shaft portion 122 is provided with a conveying blade 124 and a counter blade 126. The conveying blade 124 is provided along the outer peripheral surface of the first portion 122*a* in a spiral shape and conveys the developer in the first space 151*s* toward the third space 153*s*. The counter blade 126 is provided between the conveying blade 124 and the third space 153*s* (the discharge path 170). The counter blade 126 conveys the developer in a direction opposite to the conveyance direction of the conveying blade 124. That is, the counter blade 126 has a function of pushing back the developer in the first space 151*s* that moves toward the third space 153*s*, to be maintained away from the third space 153*s*.

The second portion 122*b* of the shaft portion 122 is provided with a discharge blade 128. The discharge blade 128 is provided along the outer peripheral surface of the second portion 122*b* in a spiral shape and conveys the developer (e.g., the excess developer) inside the third space 153*s* toward the discharge port 153*h*.

The second conveying member 130 is provided inside the second space 152*s*. The second conveying member 130 is supported by the second casing portion 152 so as to be rotatable by the operation of a drive motor. The second conveying member 130 includes a shaft portion 132 which is disposed substantially parallel to the shaft portion 122. A conveying blade 134 is formed on the outer peripheral surface of the shaft portion 132. The conveying blade 134 is formed over substantially the entire area of the shaft portion 132 in the longitudinal direction and has a spiral conveying surface. The second conveying member 130 rotates around the axis by the operation of the drive motor so that the developer supplied through the developer replenishing port 152*a* is conveyed in a direction opposite to the conveying blade 124 of the first conveying member 120 while being mixed and stirred to be sufficiently charged. Additionally, the end portion of the second conveying member 130 on the side of the opening 106*b* may be provided with a counter blade 136 that pushes back the developer in a direction opposite to the developer conveying direction of the conveying blade 134.

A movement of the developer inside the example developing device 20 will be described. The developer which is replenished from the developer replenishing port 152*a* is conveyed toward the opening 106*b* while being stirred inside the second space 152*s* by the conveying blade 134 of the second conveying member 130. The developer which is conveyed by the conveying blade 134 is pushed back by the counter blade 136 so as to be introduced into the first space 151*s* through the opening 106*b*. The developer which is introduced into the first space 151*s* is conveyed toward the third space 153*s* by the first conveying member 120. At this time, a portion of the developer conveyed by the first conveying member 120 is supplied to the developer carrier 110.

The remaining developer reaches the counter blade 126. The counter blade 126 pushes back the developer, moving from the first space 151*s* (e.g., along the conveyance path 160) toward the third space 153*s* (e.g., the discharge path 170), to be maintained away from the third space 153*s*. The developer which is pushed back by the counter blade 126 is returned toward the second space 152*s* through the opening 106*a*. Then, the developer which is returned toward the second space 152*s* is conveyed again by the second conveying member 130. That is, the developer inside the casing 100 circulates between the first space 151*s* and the second space 152*s* by the cooperative operation of the first conveying member 120 and the second conveying member 130. The first space 151*s* and the second space 152*s* form the conveyance path 160 that circulates the developer and supplies the developer to the developer carrier 110.

Since the developer is replenished from the developer replenishing port 152*a*, a portion of the developer reaching the counter blade 126 is introduced into the third space 153*s* over the counter blade 126 when the amount of the developer circulating inside the conveyance path 160 exceeds a predetermined amount. The developer which is introduced into the third space 153*s* is conveyed by the discharge blade 128 of the first conveying member 120 toward the discharge port 153*h*. The developer which reaches the discharge port 153*h* is discharged from the discharge port 153*h*. That is, the third space 153*s* and the discharge port 153*h* form the discharge path 170 for discharging the developer.

As described above, in the developing device 20, the amount of the developer circulating in the conveyance path 160 is maintained at a predetermined amount by balancing the amount of the developer supplied from the developer replenishing port 152*a* and the amount of the developer discharged from the discharge port 153*h*. As a result, an appropriate amount of the developer is supplied to the developer carrier 110.

In some cases, the internal pressure of the casing 100 increases when air is taken into the casing 100 by the rotation of the developer carrier 110. When the internal pressure of the casing 100 increases, a flow of air may be generated from the conveyance path 160 toward the discharge path 170 and an unexpectedly excessive amount of the developer circulating in the conveyance path 160 along the flow may be discharged from the discharge port 153*h*.

In order to prevent the excessive discharge of the developer due to the flow of air inside the casing 100, the example developing device 20 further includes a valve body 200. The valve body 200 is provided in the discharge path 170 between the counter blade 126 and the discharge port 153*h*. The valve body 200 will be described in further below.

Figure 3:
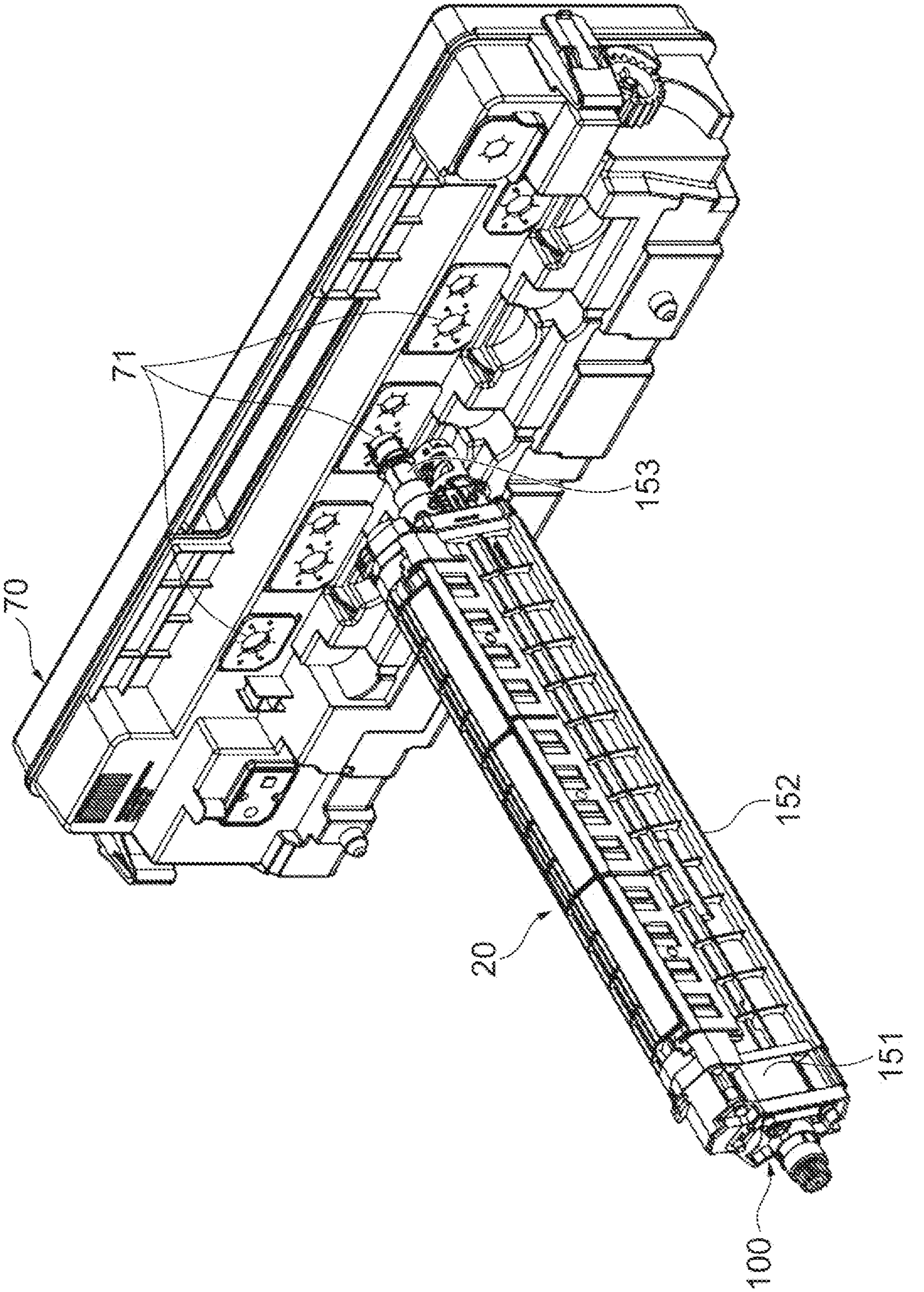
FIG. 3 is a perspective view of an example developing device and a developer collecting device.

As illustrated in FIG. 3, the imaging apparatus 1 further includes a developer collecting device 70 which collects the developer. The developer collecting device 70 is connected to the developing device 20. More specifically, the developer collecting device 70 includes a plurality of insertion holes 71 and the third casing portion 153 of the developing device 20 is inserted into a corresponding one of the insertion holes 71 so that the discharge port 153*h* is disposed inside a collection space L of the developer collecting device 70 (cf. FIG. 4). Additionally, a seal member may be provided between the insertion hole 71 and the third casing portion 153 in order to prevent the leakage of the developer. The four developing devices 20C, 20M, 20Y, and 20K (cf. FIG. 1) are thus mounted to the developer collecting device 70 via the corresponding ones the insertion holes 71.

Figure 4:
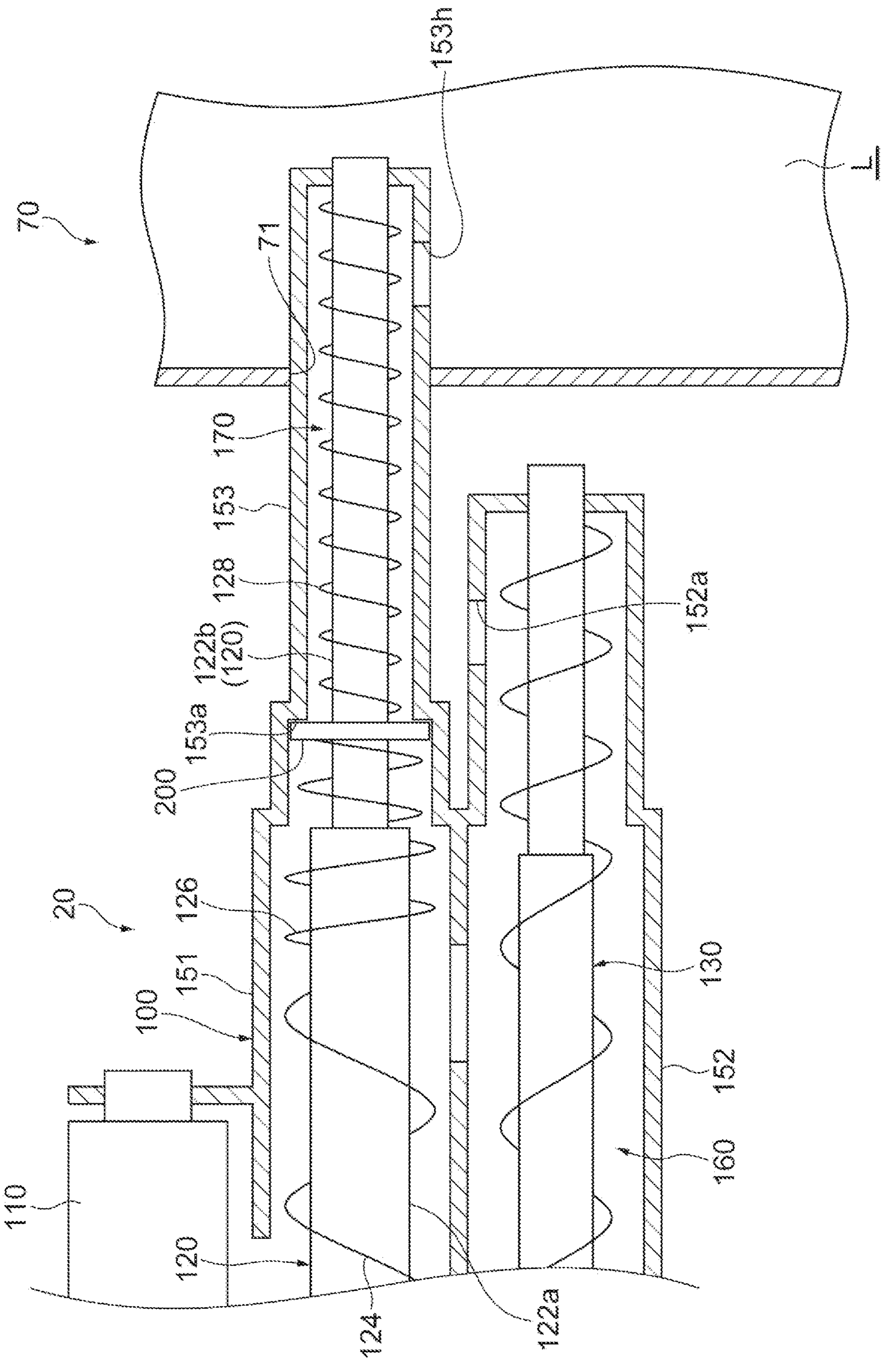
FIG. 4 is an enlarged cross-sectional view of a portion of the developing device of FIG. 3, illustrating a vicinity of a discharge path of the developing device.

As illustrated in FIG. 4, the valve body 200 is provided in the discharge path 170 which is defined by the third casing portion 153. As illustrated, the cross-sectional area of the discharge path 170 may be smaller than the cross-section area of the first space 151*s*. For example, the third casing portion 153 is provided with a step surface 153*a* which extends radially, in a direction orthogonal to the developer discharge direction. The valve body 200 may be disposed so as to be in contact with the step surface 153*a*.

The valve body 200 includes an inlet side oriented toward the conveyance path 160 (or toward the counter blade 126) and an outlet side disposed on a side opposite to the inlet side and to allow the passage of a portion of the developer from the conveyance path 160 through to the discharge path 170 when a pressure applied to the inlet side is greater than a pressure threshold value.

Figure 5:
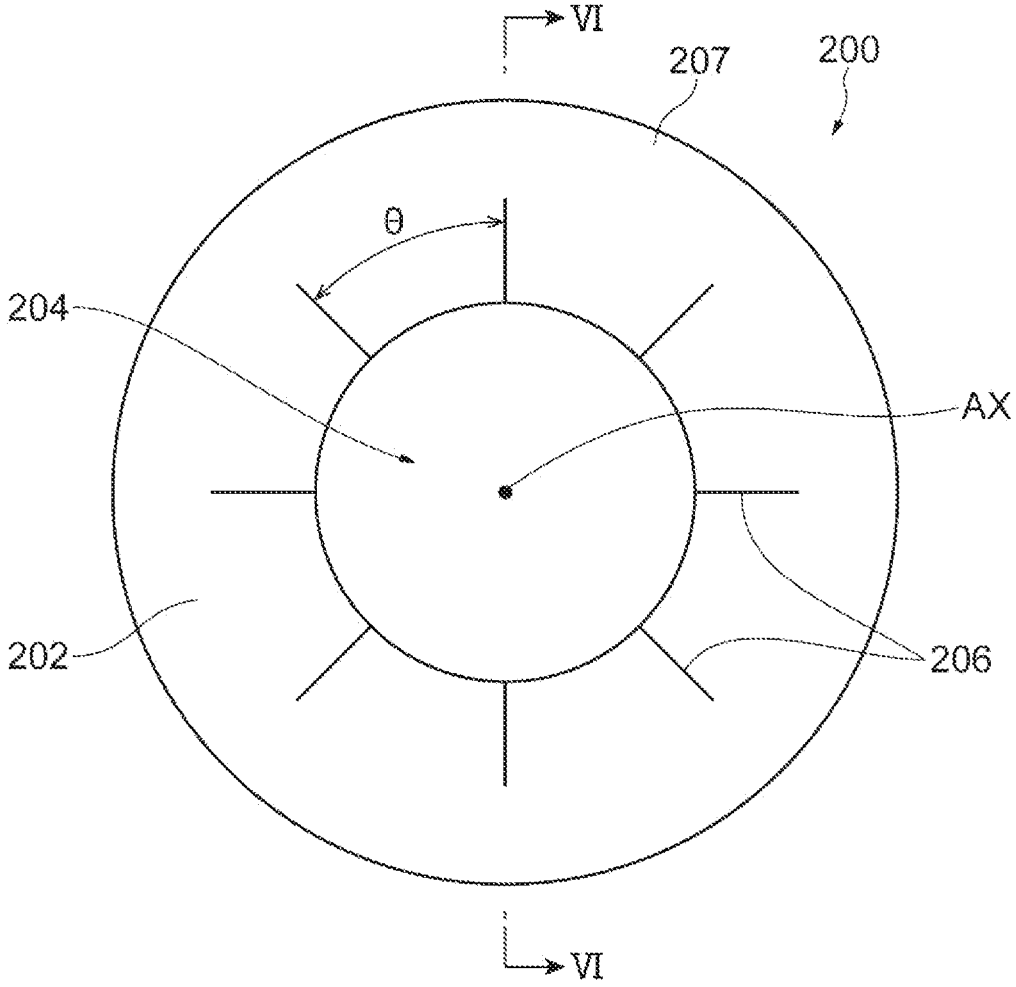
FIG. 5 is a front view of an example valve body.
Figure 6:
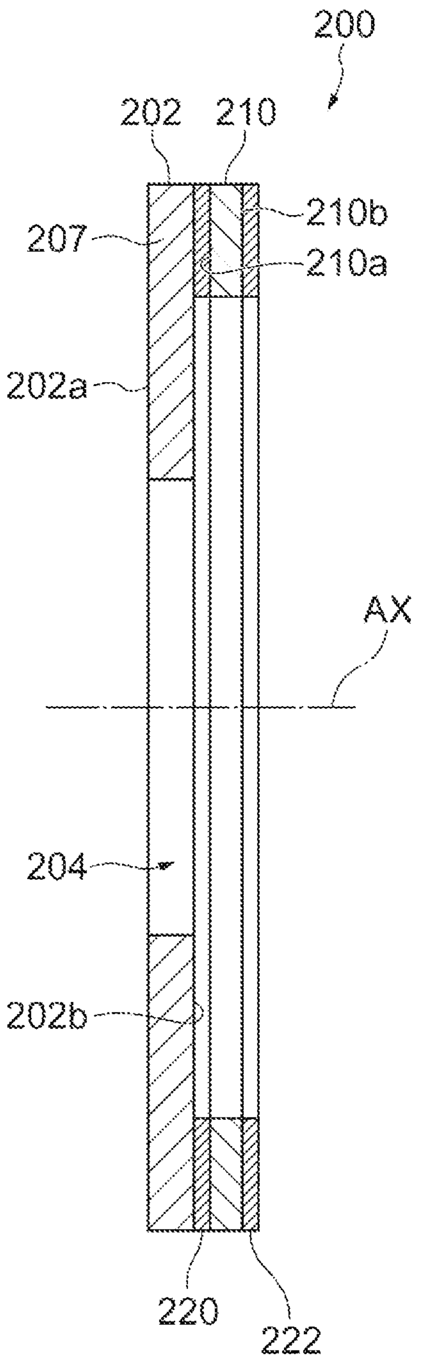
FIG. 6 is a cross-sectional view of the valve body illustrated in FIG. 5, taken along line VI-VI.

FIG. 5 is a front view of the example valve body 200 and FIG. 6 is a cross-sectional view of the valve body 200 taken along line VI-VI illustrated in FIG. 5. As illustrated in FIGS. 5 and 6, the valve body 200 includes a ring-shaped (donut-shaped) sheet member 202 that is made of an elastic member such as urethane. This sheet member 202 includes an inlet surface 202*a* oriented toward the conveyance path 160 and an outlet surface 202*b* oriented toward the discharge port 153*h*. The inlet surface 202*a* of the sheet member 202 forms the inlet side of the valve body 200.

An opening 204 which penetrates from the inlet surface 202*a* through to the outlet surface 202*b* is formed at the center portion of the sheet member 202. The opening 204 has a diameter slightly larger than the outer diameter of the shaft portion 122 of the first conveying member 120. The shaft portion 122 of the first conveying member 120 is fitted through the opening 204.

As illustrated in FIG. 5, the sheet member 202 is provided with a plurality of slits 206. The plurality of slits 206 may be incisions formed from the inlet surface 202*a* of the sheet member 202 to the outlet surface 202*b* that extend in the radial direction with respect to the center axis AX of the sheet member 202. The plurality of slits 206 are formed at substantially the same intervals in the circumferential direction of the sheet member 202. In the example illustrated in FIG. 5, the sheet member 202 is provided with eight slits 206.

As illustrated in FIG. 5, the plurality of slits 206 extend from the inner peripheral surface of the sheet member 202 formed at the opening 204 to a middle position of the sheet member 202 in the radial direction. That is, the sheet member 202 includes an outer peripheral portion 207 not provided with the plurality of slits 206.

A reinforcement member 210 is provided on the outlet surface 202*b* of the sheet member 202. The reinforcement member 210 is made of a material such as polyester having strength higher than that of the sheet member 202. The reinforcement member 210 is formed in a ring shape and has an opening having a diameter that is greater than the diameter of the opening 204 formed in the sheet member 202. A front surface 210*a* of the reinforcement member 210 is attached to the outlet surface 202*b* of the sheet member 202 by a ring-shaped double-sided tape 220. The strength of the valve body 200 can be increased by the reinforcement member 210. A rear surface 210*b* of the reinforcement member 210 is attached to the step surface 153*a* of the third casing portion 153 (cf. FIG. 4) by a ring-shaped double-sided tape 222. That is, the valve body 200 is fixed to the inner wall of the third casing portion 153. Additionally, the rear surface 210*b* of the reinforcement member 210 forms the outlet side disposed on the side opposite to the inlet side of the valve body 200.

Figure 7:
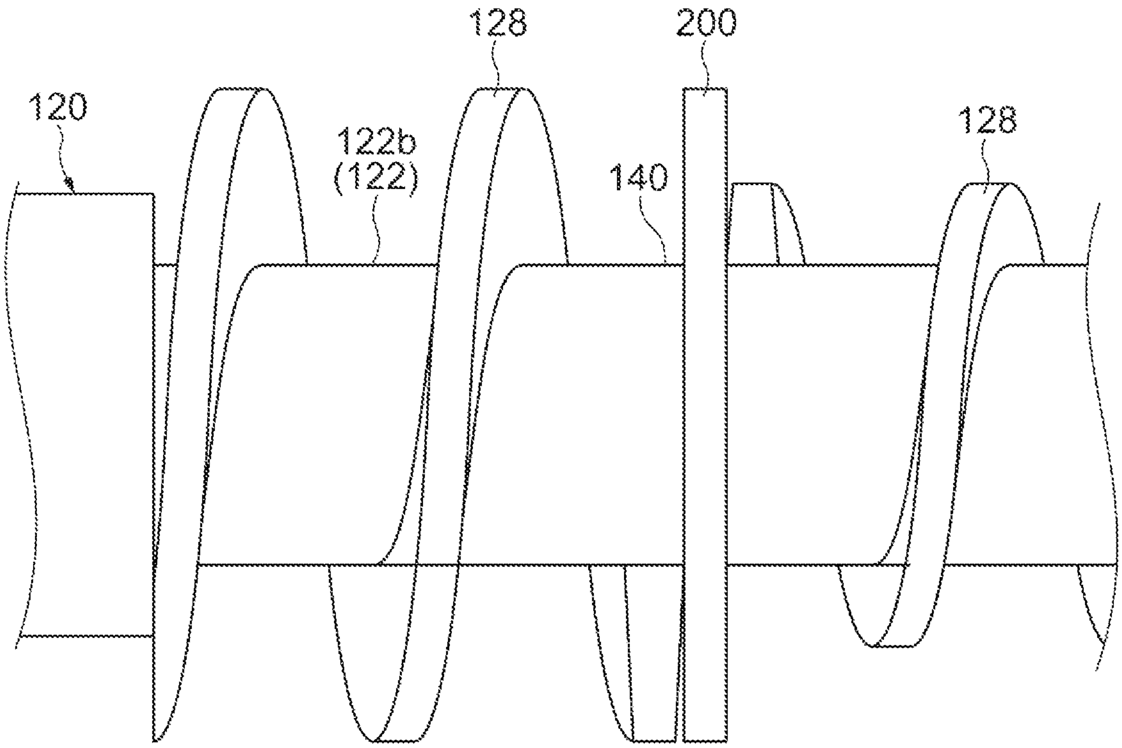
FIG. 7 is a side view illustrating a part of a first conveying member and a valve body.

With reference to FIG. 7, the example valve body 200 is fitted to the first conveying member 120, so as to surround the shaft portion 122 of the first conveying member 120 inside the discharge path 170. As illustrated in FIG. 7, the second portion 122*b* of the shaft portion 122 includes a notch portion 140 in which the discharge blade 128 is partially notched, and the valve body 200 is disposed in the notch portion 140. Accordingly, the discharge blades 128 provided on each side of the valve body 200 prevent the valve body 200 from being displaced in the axial direction of the first conveying member 120.

In the example valve body 200, the plurality of slits 206 are closed by the elastic force of the sheet member 202 when the pressure applied to the inlet surface 202*a* of the sheet member 202 is less than a predetermined pressure threshold value. Thus, when the pressure applied to the inlet surface 202*a* is less than the predetermined pressure threshold value, the developer inside the discharge path 170 is retained on the upstream side of the valve body 200 without passing through the valve body 200.

In contrast, when the pressure applied to the inlet surface 202*a* is greater than the predetermined pressure threshold value, the plurality of slits 206 are enlarged to form openings in response to the elastic force of the sheet member 202 due to the pressure so that a passage through which the developer flows is formed in the sheet member 202. Accordingly, the developer inside the discharge path 170 can pass through the valve body 200. That is, the valve body 200 has a function of allowing the developer from the conveyance path 160 to pass therethrough when the pressure applied to the inlet surface 202*a* is greater than the predetermined pressure threshold value.

PA denotes the pressure applied to the inlet surface 202*a* of the valve body 200 due to the flow of air generated by the internal pressure inside the casing 100 and PD denotes the pressure applied to the inlet surface 202*a* of the valve body 200 due to the flow of the developer conveyed by the discharge blade 128 of the first conveying member 120. The pressure PA is most often less than the pressure PD. The predetermined pressure threshold value at which the plurality of slits 206 are opened is set so as to be greater than the pressure PA and less than the pressure PD. Accordingly, the excessive discharge of developer is prevented or inhibited since the valve body 200 is in a closed state even when a flow of air is generated inside the casing 100 due to an increase in the internal pressure inside the casing 100. On the other hand, when the developer inside the discharge path 170 is pushed into the valve body 200 due to the discharge blade 128 of the first conveying member 120, the valve body 200 is opened by the pressure so that the developer passes through the valve body 200 so as to be discharged.

The pressure threshold value that causes the valve body 200 to open can be adjusted by the thickness of the sheet member 202 or the number of the slits 206 to be formed in the sheet member 202. For example, the thickness of the sheet member 202 may be set, for example, to be between 0.1 mm and 0.5 mm. Further, the number of the plurality of slits 206 may be, for example, 5 to 16 slits. In some examples, the plurality of slits 206 may be formed so that an angle θ formed by two adjacent slits 206 of the plurality of slits 206 in the circumferential direction of the center axis AX of the sheet member 202 is between 22.5° and 45° (cf. FIG. 5). When the thickness of the sheet member 202 and the number of the plurality of slits 206 are set in this way, the deteriorated developer can be discharged from the casing 100 while preventing the excessive discharge of the developer due to the flow of air inside the casing 100.

As described above, in the developing device 20, the discharge path 170 is provided with the valve body 200 which allows a portion of the developer from the conveyance path 160 to pass therethrough when the pressure applied to the inlet surface 202*a* is greater than the predetermined pressure threshold value. Since the valve body 200 interrupts the flow of air directed from the conveyance path 160 toward the discharge path 170, it is possible to prevent the developer inside the casing 100 from being excessively discharged by the flow of air. On the other hand, when the developer having passed over the counter blade 126 is pushed into the valve body 200 by the discharge blade 128, the valve body 200 is opened so that the developer passes through the valve body 200. The developer having passed through the valve body 200 is conveyed to the discharge port 153*h* by the discharge blade 128 and is collected by the developer collecting device 70. Accordingly, the deteriorated developer can be discharged from the casing 100 while preventing the excessive discharge of the developer due to the flow of air inside the casing 100.

Figure 8B:
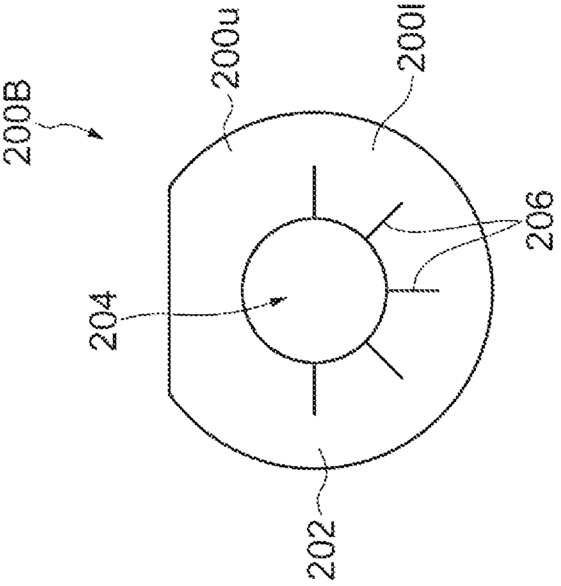
FIG. 8B is a front view illustrating another example valve body.
Figure 8A:
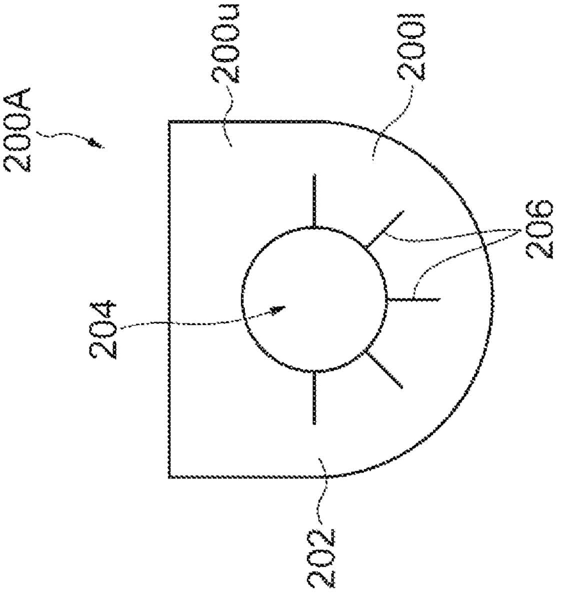
FIG. 8A is a front view illustrating another example of the valve body.

Additionally, although the valve body 200 illustrated in FIG. 5 has a ring shape, the shape of the valve body is not limited to the ring shape and may be formed in various shapes. For example, FIGS. 8A and 8B illustrate other examples of the valve body. The sheet members 202 of an example valve body 200A illustrated in FIG. 8A and an example valve body 200B illustrated in FIG. 8B each includes an upper portion 200*u* and a lower portion 200*l* which are asymmetric. For example, in a front view of the valve body 200A, the upper portion 200*u* has a rectangular shape and the lower portion 200*l* of the valve body 200A has a semi-circular shape. Further, in a front view of the valve body 200B, the upper portion 200*u* has a truncated semi-circular shape (e.g., in which a part is missing), and the lower portion 200*l* of the valve body 200B has a semi-circular shape. Accordingly, the upper portion 200*u* and the lower portion 200*l* may be shaped asymmetrically as in the valve body 200A and the valve body 200B for example, to position the valve body in the casing 100 (e.g., in the third casing portion 153), for example to prevent the valve body 200A and the valve body 200B from being attached in the wrong orientation.

Further, as illustrated in FIGS. 8A and 8B, the plurality of slits 206 may be formed in the lower portion 200*l* among the upper portion 200*u* and the lower portion 200*l*. Since the developer inside the discharge path 170 is conveyed while being collected in the lower portion inside the discharge path 170 due to the gravity, the developer can pass through the slits 206 open in response to the pressure applied to the inlet surface 202*a* even when the plurality of slits 206 are formed in the lower portion 200*l* and not in the upper portion 200*u*.

Figure 9B:
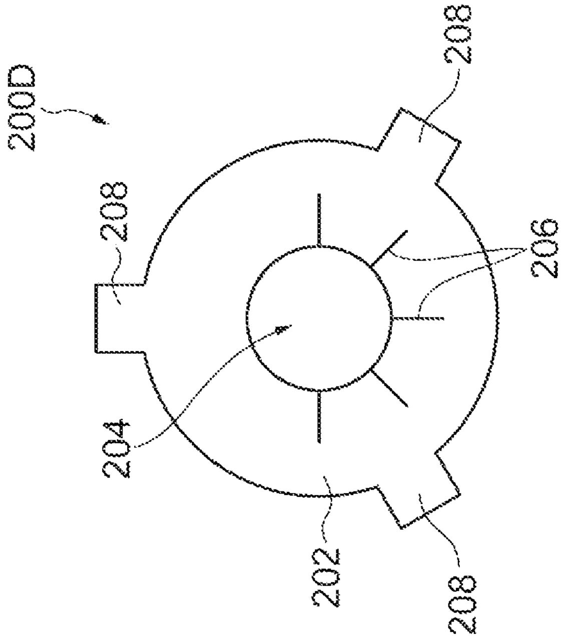
FIG. 9B is a front view illustrating still another example of the valve body.
Figure 9A:
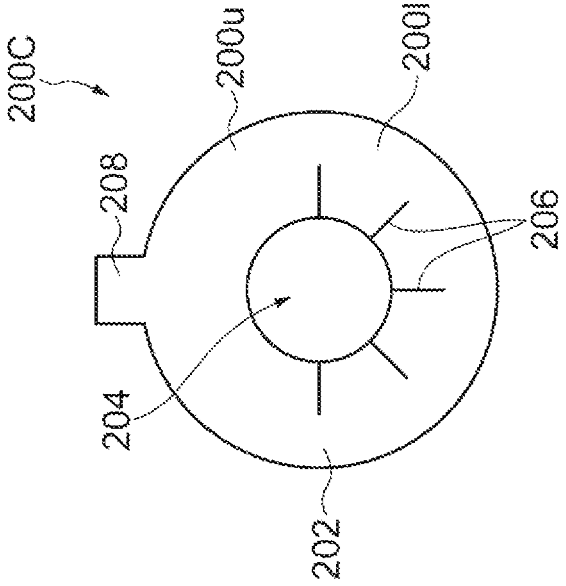
FIG. 9A is a front view illustrating still another example of the valve body.

FIGS. 9A and 9B illustrate still another example of the valve body. The sheet members 202 of an example valve body 200C illustrated in FIG. 9A and of an example valve body 200D illustrated in FIG. 9B include protrusions (or convex portions) 208 for positioning. For example, the upper portion 200*u* of the valve body 200C illustrated in FIG. 9A is provided with one protrusion 208 which protrudes radially. The upper portion 200*u* of the valve body 200D illustrated in FIG. 9B is provided with one protrusion 208 protruding radially and the lower portion 200*l* of the valve body 200D is provided with two protrusions 208 protruding radially. These protrusions 208 are disposed so as to be fitted to the concave portion formed in the third casing portion 153, so as to position the valve bodies 200C and 200D.

Figure 10B:
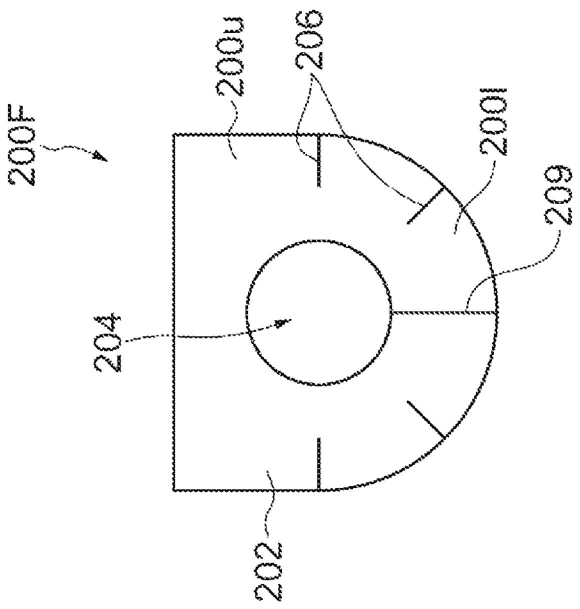
FIG. 10B is a front view illustrating still another example of the valve body.
Figure 10A:
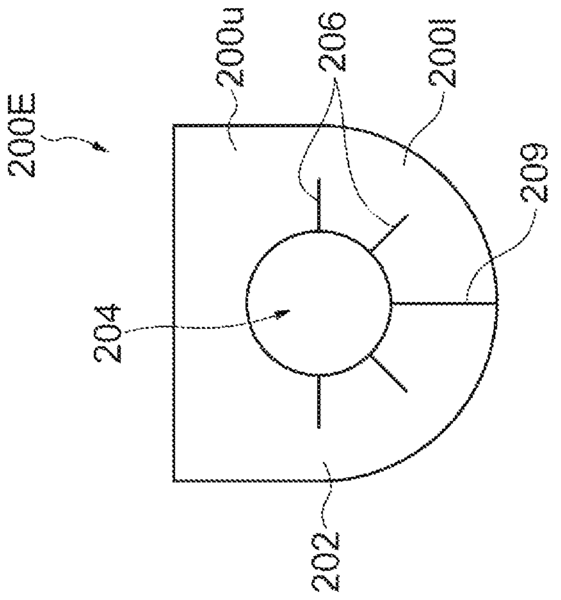
FIG. 10A is a front view illustrating still another example of the valve body.

FIGS. 10A and 10B illustrates other examples of the valve body. An example valve body 200E illustrated in FIG. 10A is further provided with a separation slit 209 which extends from the inner peripheral surface of the valve body 200E to the outer peripheral surface. The separation slit 209 may be widened in order to mount the valve body 200E around the shaft portion 122 of the first conveying member 120.

The plurality of slits 206 may be formed in the outer peripheral portion of the sheet member 202. For example, an example valve body 200F illustrated in FIG. 10B is provided with the plurality of slits 206 which extend from the outer peripheral surface of the sheet member 202 inwardly, toward the middle position of the sheet member 202 in the radial direction.

Figure 11:
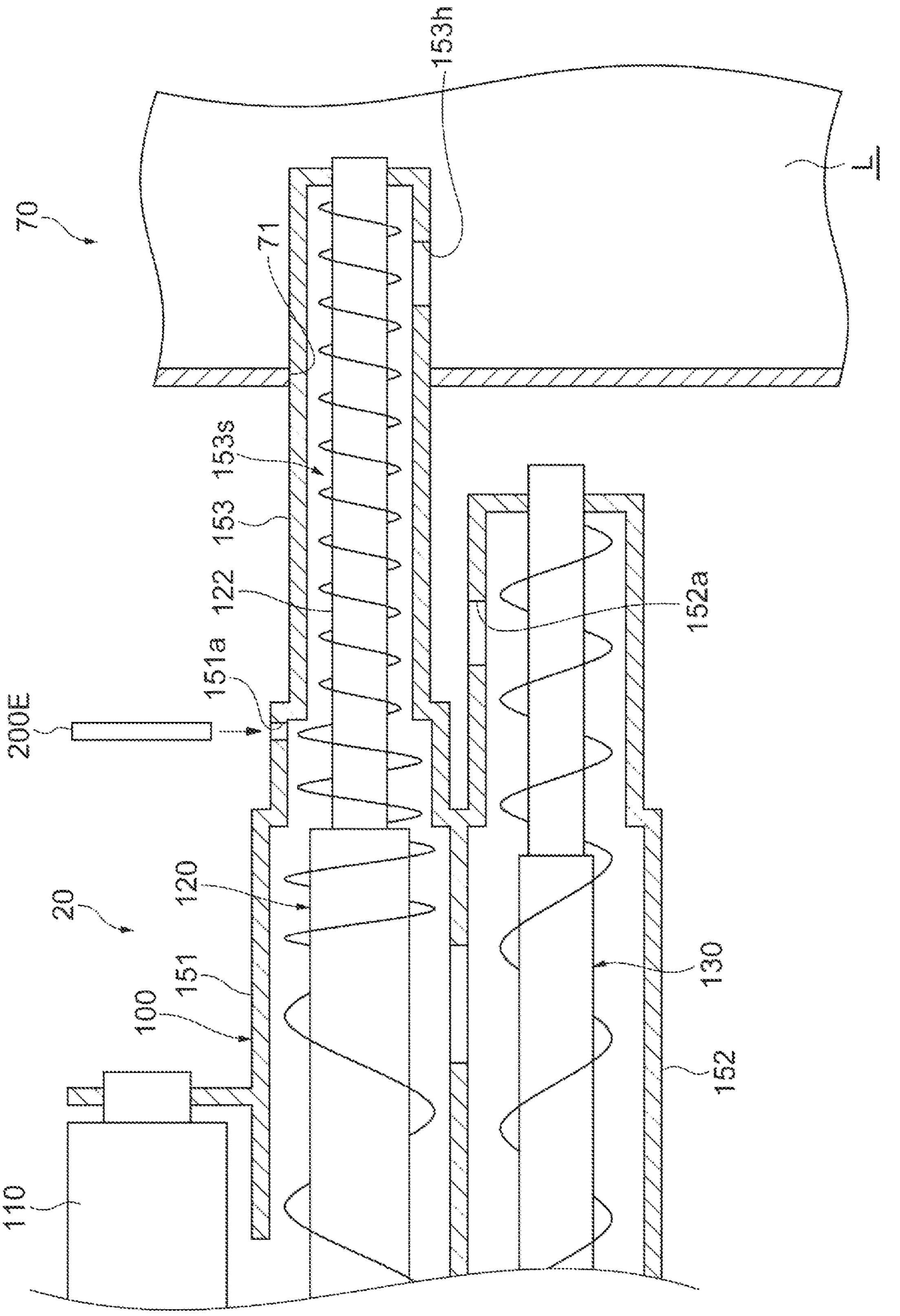
FIG. 11 is a partial cross-sectional view of another example developing device, illustrating the vicinity of a discharge path of the developing device.

With reference to FIG. 11, in order to facilitate the installation of the valve body, the third casing portion 153 of the developing device 20 may be provided with an insertion hole 151*a* to insert the valve body 200E therein. As illustrated in FIG. 11, the valve body 200E (cf. FIG. 10A) may be inserted into the third space 153*s* through the insertion hole 151*a* so as to be attached to the shaft portion 122 of the first conveying member 120, so as to facilitate an installation of the valve body 200E.

Next, an operation and effect of the developing device 20 will be described with reference to test examples 1A, 1B, 2A, 2B, 3A and 3C, although the present disclosure is not limited to the test examples described.

Figure 12:
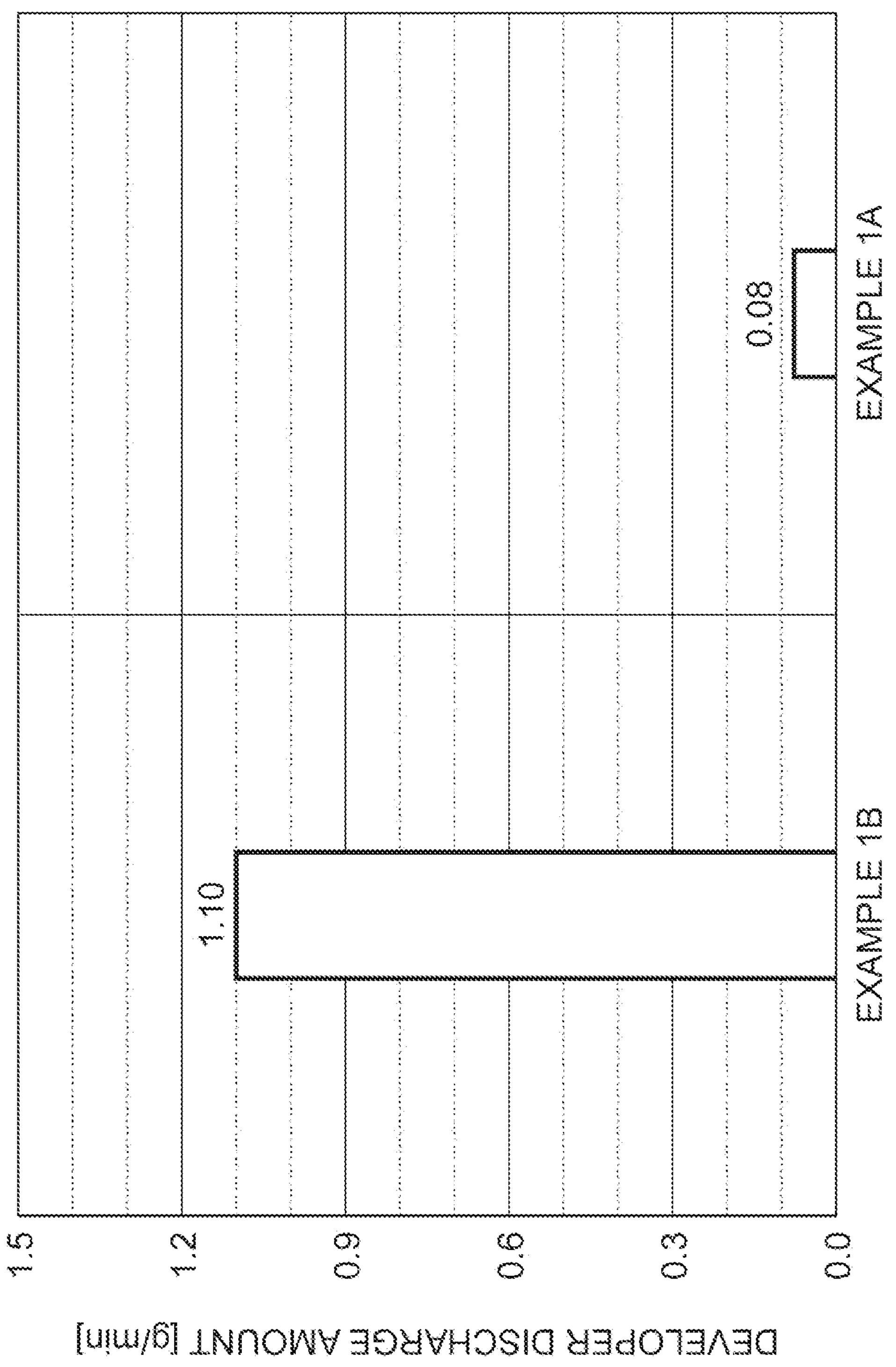
FIG. 12 is a graph showing a developer discharge amount per time unit in a set of test examples.

Firstly, the amount of the developer discharged by the flow of air inside the casing 100 was evaluated. In Example 1A, the developing device 20 was operated with the valve body 200 illustrated in FIG. 5, while no replenishment developer was supplied to the developing device 20, and the printing process was not performed. Further, in Example 1A, in order to simulate a state in which the internal pressure inside the casing 100 increases, a tape was attached to the filter 101 so that air did not leak from the pressure release hole 150*a* (cf. FIG. 2). Then, the discharge amount of the developer from the discharge port 153*h* per time unit was measured. On the other hand, in Example 1B, the discharge amount of the developer per time unit was measured with similar conditions as that of Example 1A, with the exception that the valve body 200 was not provided. That is, the discharge amount of the developer per time unit measured in Example 1A and Example 1B corresponds to the amount of excessive discharge of developer due to the flow of air inside the casing 100. FIG. 12 shows the discharge amount of the developer per time unit measured in Example 1A and in Example 1B. As shown in FIG. 12, the discharge amount of the developer per time unit was 1.10 g/min in Example 1B in which the valve body 200 was not used, but the discharge amount of the developer per time unit was 0.08 g/min in Example 1A in which the valve body 200 was used. From these results, it was observed that the amount of excessive discharge of developer due to the flow of air inside the casing 100 could be greatly decreased when the discharge path 170 was provided with the valve body 200.

Figure 13:
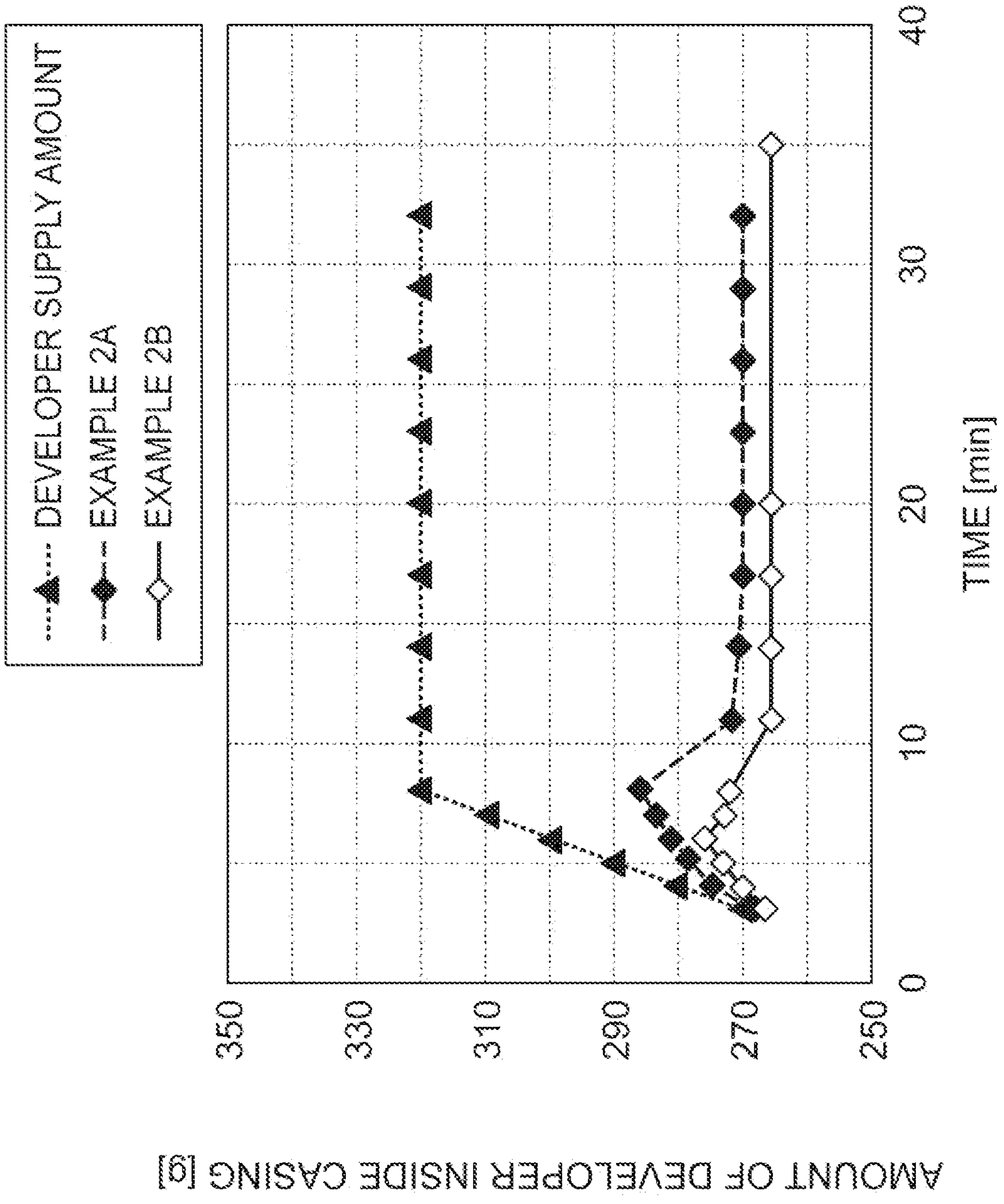
FIG. 13 is a graph showing a change over time in the amount of the developer in another set of test examples.

Next, the amount of the developer discharged through the discharge path 170 by the discharge blade 128 of the first conveying member 120 was evaluated. In Example 2A, the developing device 20 was operated with the valve body 200 illustrated in FIG. 5, while the printing process of the developing device 20 was not performed, and new developer (or replenishment developer) was supplied to the casing 100. More specifically, the developer was supplied at 10 g/min into the casing 100 for a duration of 8 minutes. Further, in Example 2A, in order to prevent the excessive discharge of the developer due to the flow of air inside the casing 100, the filter 101 was provided so as to allow a passage of air inside the casing 100 out through the pressure release hole 150*a*. Then, a change over time in the amount of the developer inside the casing 100 was measured based on the amount of the developer discharged from the discharge port 153*h*. In Example 2B, a change over time in the amount of the developer inside the casing 100 was measured in similar conditions as for Example 2A, with the exception that the valve body 200 was not provided. FIG. 13 shows a change over time in the amount of the developer measured in Example 2A and Example 2B.

As shown in FIG. 13, in Example 2B, a portion of the developer was discharged so that the amount of the developer decreased in accordance with an increase in the developer supply amount into the casing 100 and the amount of the developer inside the casing 100 converged to a substantially constant amount with time. Similarly, in Example 2A, a portion of the developer was discharged so that the amount of the developer decreased in accordance with an increase in the developer supply amount into the casing 100 and the amount of the developer inside the casing 100 converged to a substantially constant amount with time. From these results, it was observed that even when the valve body 200 was provided in the discharge path 170, a portion of the developer inside the conveyance path 160 was appropriately discharged while passing through the valve body 200 due to the pressure applied to the valve body 200 by the discharge blade 128 so that the developer supply amount and the developer discharge amount could be balanced.

Figure 14:
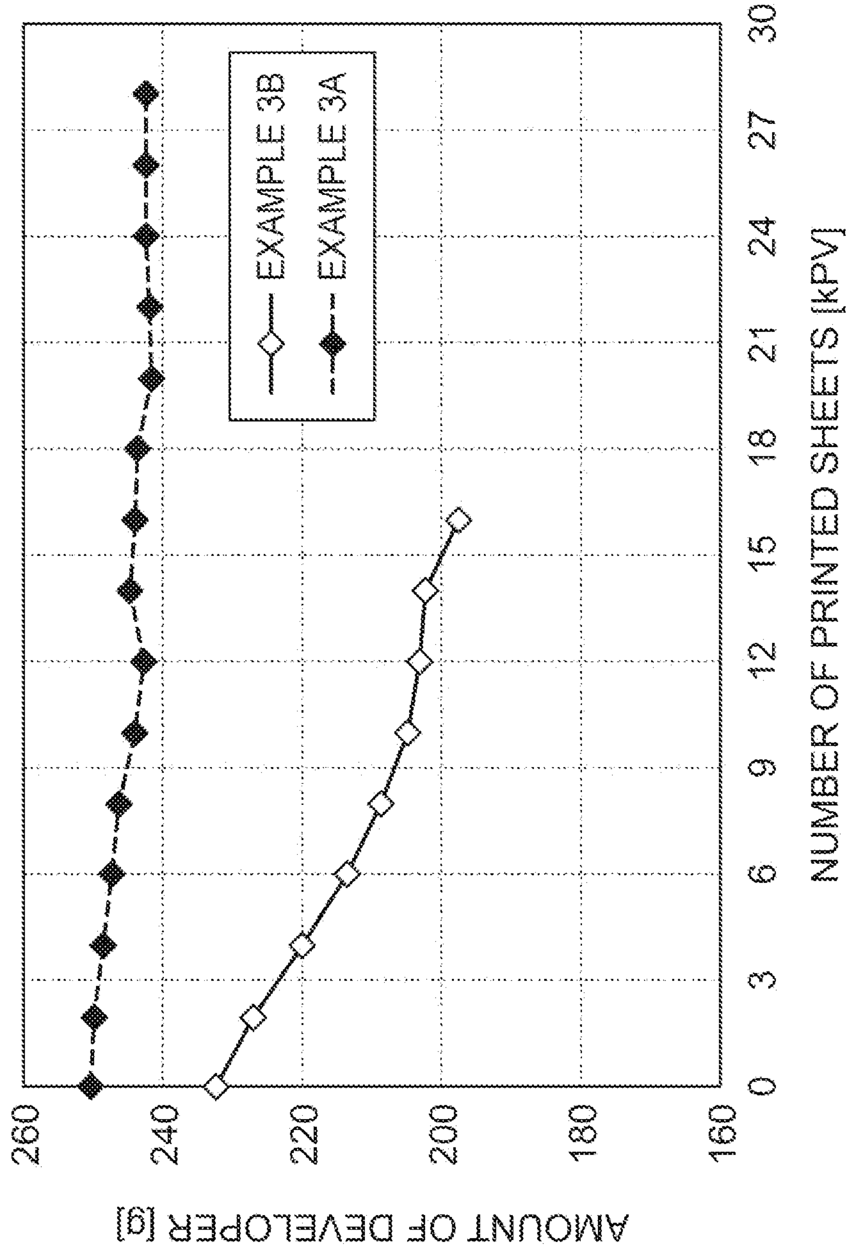
FIG. 14 is a graph showing a change over time in the amount of the developer in another set of test examples.

Next, an effect of preventing the excessive discharge of the developer due to the flow of air inside the casing 100 was evaluated. In Example 3A, a printing process was performed at the image density of 1% while supplying the developer to the developing device 20 which includes the valve body 200 illustrated in FIG. 5. Additionally, the filter 101 was operated to allow passage of air inside the casing 100 out from the pressure release hole 150*a*. Then, a change over time in the amount of the developer inside the casing 100 was measured based on the weight of the developing device 20. In Example 3B, a change over time in the amount of the developer inside the casing 100 was measured with similar conditions as that of Example 3A, with the exception that the valve body 200 was not provided. FIG. 14 shows a change over time in the amount of the developer measured in Example 3A and Example 3B.

As shown in FIG. 14, in Example 3A, the amount of the developer inside the casing 100 decreased in accordance with an increase in the number of printed sheets so that a printing failure occurred when the amount of the developer reached 200 g or less. It was considered that this result was due to a deterioration of the function of the filter 101 and an increase in the internal pressure of the casing 100 in accordance with an increase in the number of printed sheets so that the developer inside the casing 100 was excessively discharged due to the flow of air generated inside the casing 100. In contrast, in Example 3A, the amount of the developer inside the casing 100 was constantly maintained at about 242 g even when the number of printed sheets increased. It was considered that this result was caused because the excessive discharge of the developer due to the flow of air inside the casing 100 was prevented by the valve body 200. From these results, it was observed that the excessive discharge of the developer inside the developing device 20 could be prevented when the valve body 200 was provided in the discharge path 170.

It should be understood that not all aspects, advantages, and features described herein are achieved or included in any one particular example. For example, although the example valve body 200 is described above as being fixed to the inner wall of the third casing portion 153, in some examples, the valve body may be fixed to the first conveying member 120 to rotate together with the first conveying member 120.

Although various examples have been described and illustrated herein, it should be apparent that other examples may be modified in arrangement and detail is omitted.

The invention claimed is:

1. A developing device comprising:
a developer carrier to carry a developer;
a conveyance path to circulate the developer and to supply the developer to the developer carrier;
a discharge path extending from the conveyance path, wherein the discharge path includes a discharge port to discharge a portion of the developer, as excess developer; and
a valve body provided between the conveyance path and the discharge port, the valve body including an inlet side oriented toward the conveyance path and an outlet side disposed opposite the inlet side to allow a passage of the excess developer from the conveyance path through the valve body, toward the discharge port, when a pressure applied to the inlet side is greater than a pressure threshold value.

2. The developing device according to claim 1, comprising:
a first conveying member to convey the developer, wherein the first conveying member includes a shaft having a first portion disposed inside the conveyance path and a second portion disposed inside the discharge path; and
a second conveying member disposed inside the conveyance path to circulate the developer inside the conveyance path in cooperation with the first portion of the first conveying member,
wherein the valve body is disposed so as to surround an entire circumference of the second portion of the shaft inside the discharge path.

3. The developing device according to claim 2,
wherein the first conveying member includes a conveying blade to convey the developer inside the conveyance path toward the discharge path and a counter blade provided between the conveying blade and the discharge path to push back the developer away from the discharge path, and
wherein the valve body is disposed between the counter blade and the discharge port.

4. The developing device according to claim 2,
wherein the second portion of the shaft is provided with a discharge blade which conveys the excess developer toward the discharge port,
wherein a notch is formed in the discharge blade, and
wherein the valve body is disposed in the notch of the discharge blade.

5. The developing device according to claim 1,
wherein the valve body is fixed to an inner wall of a casing defining the discharge path.

6. The developing device according to claim 1,
wherein the valve body includes a sheet member provided with a plurality of slits.

7. The developing device according to claim 6,
wherein the sheet member extends substantially along a plane that defines a center axis extending orthogonally with respect to the plane, and
wherein the plurality of slits extend radially with respect to the center axis of the sheet member.

8. The developing device according to claim 6,
wherein the sheet member is made of urethane.

9. The developing device according to claim 6,
wherein the valve body further includes a reinforcement member that is made of polyester, and wherein the reinforcement member is attached to the sheet member on the outlet side.

10. The developing device according to claim 6, wherein the sheet member includes an upper portion and a lower portion having shapes asymmetric to each other.

11. The developing device according to claim 10, wherein the plurality of slits are formed in the lower portion exclusively.

12. The developing device according to claim 10, wherein the sheet member includes a positioning convex portion.

13. The developing device according to claim 6, wherein the sheet member has a thickness of approximately 0.1 mm to 0.5 mm.

14. The developing device according to claim 7, wherein an angle formed by two adjacent slits of the plurality of slits is approximately 22.5° to 45°.

15. An imaging system comprising:

a photosensitive body having a surface on which an electrostatic latent image is to be formed;

a developing device to develop an electrostatic latent image formed on the surface of the photosensitive body; and a developer collecting device to collect a developer discharged from the developing device, wherein the developing device includes:

a developer carrier to carry the developer;

a conveyance path to circulate the developer and to supply the developer to the developer carrier;

a discharge path extending from the conveyance path and including a discharge port to discharge a portion of the developer as excess developer; and a valve body provided between the conveyance path and the discharge port, wherein the valve body includes an inlet side directed to the conveyance path and an outlet side disposed opposite the inlet side, to allow a passage of the excess developer from the conveyance path through the valve body toward the discharge port, when a pressure applied to the inlet side is greater than a pressure threshold value.

* * * * *